Sept. 8, 1970     E. A. SPRUNGER ET AL     3,527,101
SAMPLER FOR CHROMATOGRAPHY COLUMN
Filed Jan. 19, 1968     3 Sheets-Sheet 1

INVENTORS
ALLEN S. RIECHLER
EDWIN A. SPRUNGER
BY
ATTORNEY

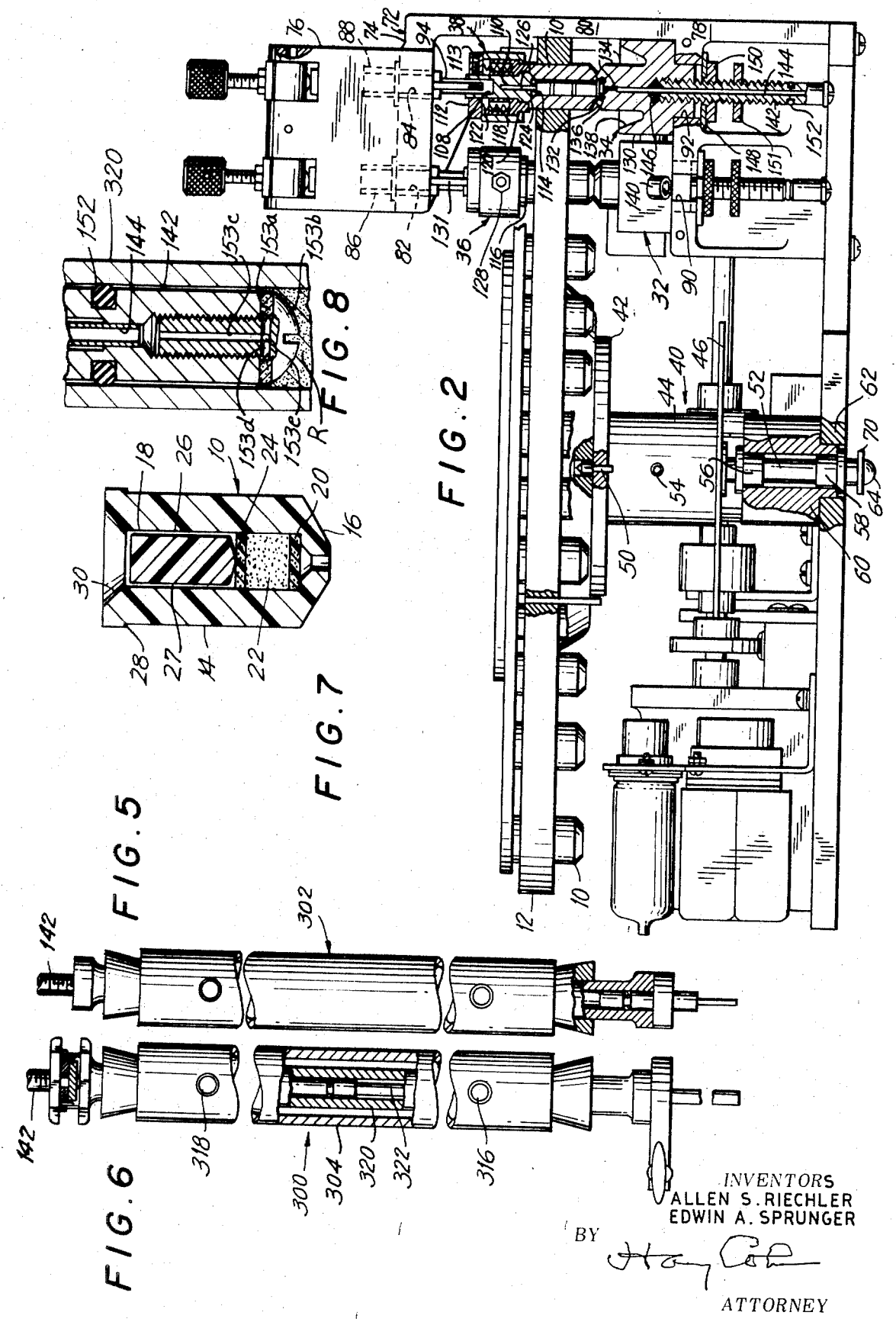

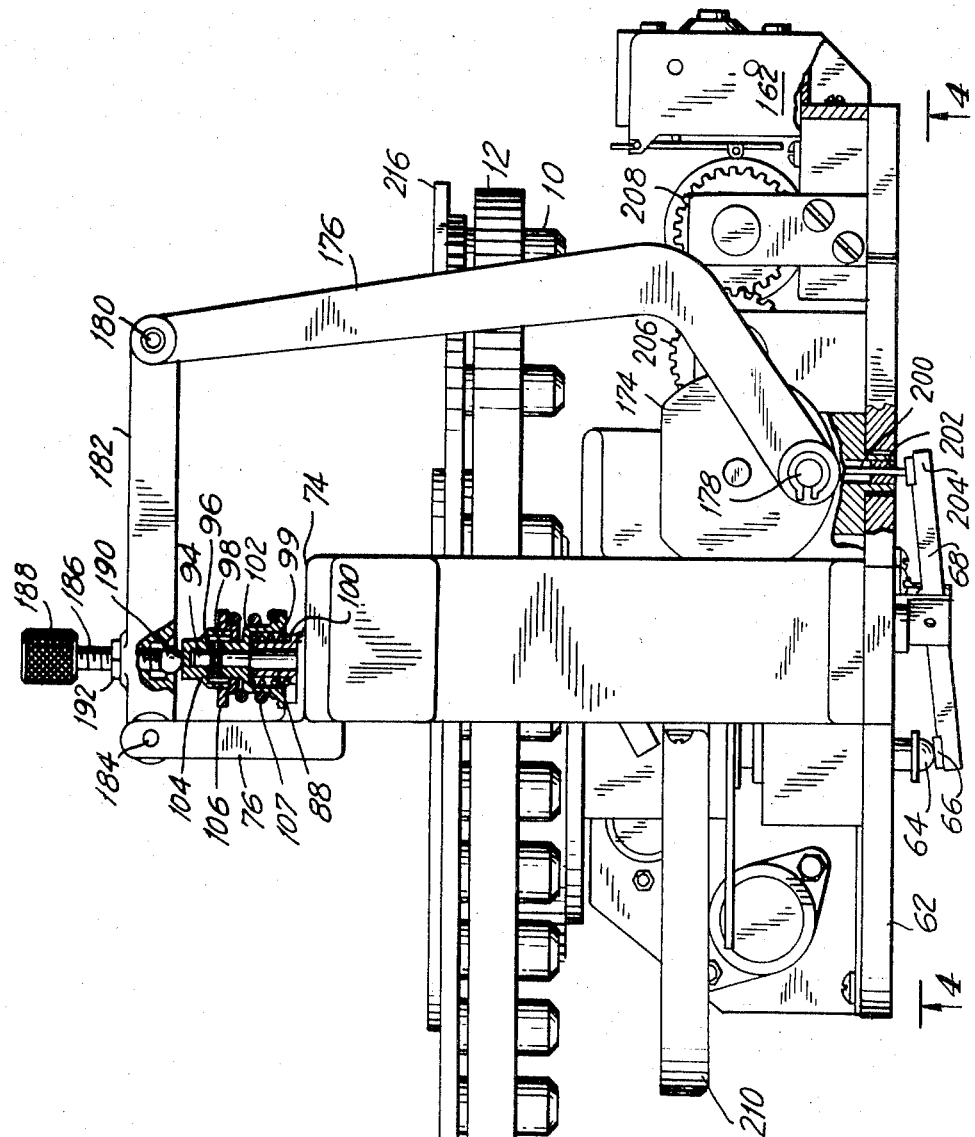
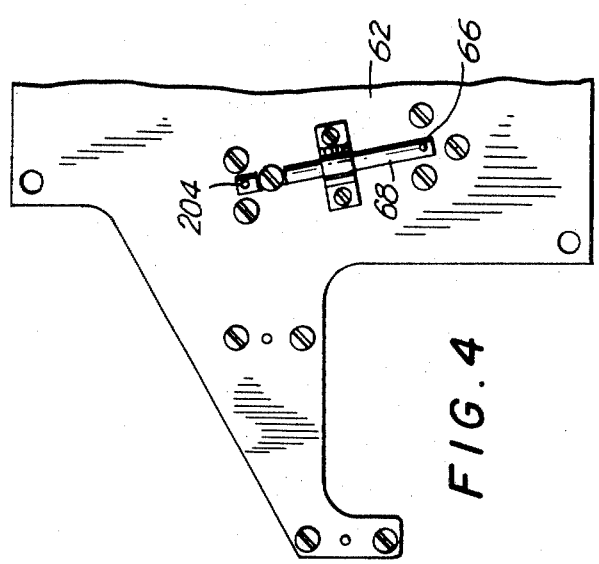

United States Patent Office 3,527,101
Patented Sept. 8, 1970

3,527,101
SAMPLER FOR CHROMATOGRAPHY COLUMN
Edwin A. Sprunger, Port Chester, and Allen S. Reichler, Pearl River, N.Y., assignors to Technicon Corporation, Chauncey, N.Y., a corporation of New York
Filed Jan. 19, 1968, Ser. No. 699,140
Int. Cl. G01n 1/10
U.S. Cl. 73—423
9 Claims

ABSTRACT OF THE DISCLOSURE

An automatic sample loading device for a set of basic and acid-neutral chromatography columns includes an indexible turntable having pairs of tubular sample containers disposed in two annular rows, to be received between two sets of eluting liquid inlet means and eluting liquid outlet means. The table is intermittently rotated, lowered and raised for each pair of containers, while the two inlet means are intermittently cranked down and up.

BACKGROUND OF THE INVENTION

Field of the invention

This invention relates to automatic chemical analysis and more particularly to automatic, sequential, chromatographic analysis of a plurality of sample liquids.

Prior art

Chromatography apparatus for the automatic analysis of liquid protein samples are well known and are shown, for example, in U.S. Pat. No. 3,010,798, issued Nov. 28, 1961 to E. C. Whitehead et al. and U.S. Pat. No. 3,166,929, issued Jan. 26, 1965 to M. H. Pelavin. In such apparatuses, a sample is initially layered into the top of the column, which may be packed with a suitable ion-exchange resin. Subsequently a stream of a suitable eluting liquid is passed under relatively high pressure through the column to strip the sample from the resin, certain constituents of the sample passing out sooner and others passing out later. A color forming reagent is continuously added to the stream of eluent from the column, which stream is divided into segments for mixing by gas segments, and the developed stream, with the gas segments removed therefrom, is passed through a colorimeter to continuously measure the optical density of the developed stream, whereby to provide an output signal which is responsive to the concentration of the different constituents of the sample.

Previously, such analyses took many hours for each sample, which sample was manually layered in the column and then run automatically. It has recently been proposed to shorten the length of time required to analyze each sample. In French Pat. 1,507,455 granted Dec. 29, 1967 there is proposed a scheme for automatically, sequentially loading and analyzing each of a plurality of samples.

SUMMARY OF THE INVENTION

Objects of the invention are to provide an improved sample supply apparatus for chromatography column analytical apparatus which (1) will permit the use of an eluting liquid at relatively high pressure; (2) will minimize the introduction of air into the analytical apparatus; and (3) will accommodate many samples within a relatively small volume of apparatus.

The sampler comprises an indexible turntable having a plurality of sample containers supported therein in an annular row, means to intermittently rotate, lower and raise the turntable to dispose each sample container in sequence onto the inlet fitting of a chromatography column, and under the outlet fitting of a source of eluting liquid, and means to tightly seal the so disposed container to and between said two fittings and to subsequently readily separate such container from said fittings.

BRIEF DESCRIPTION OF THE DRAWING

These and other objects, features and advantages of the invention will be apparent from the following specification thereof, taken in conjunction with the accompanying drawing in which:

FIG. 2 is a front view in elevation of the sampler of FIG. 1;

FIG. 3 is a side view in elevation of the sampler of FIG. 1;

FIG. 4 is a detail, bottom view in plan of the sampler of FIG. 1;

FIG. 5 is a front view in elevation of a chromatography column for acid and neutral constituents for use with the sampler of FIG. 1;

FIG. 6 is a front view in elevation of a chromatography column for basic constituents for use with the sampler of FIG. 1;

FIG. 7 is a view in elevation of a sample container for use with the sampler of FIG. 1; and FIG. 8 is a detail view in elevation of the sampler of FIG. 2.

DESCRIPTION OF THE PREFERRED EMBODIMENT

Figure 1:
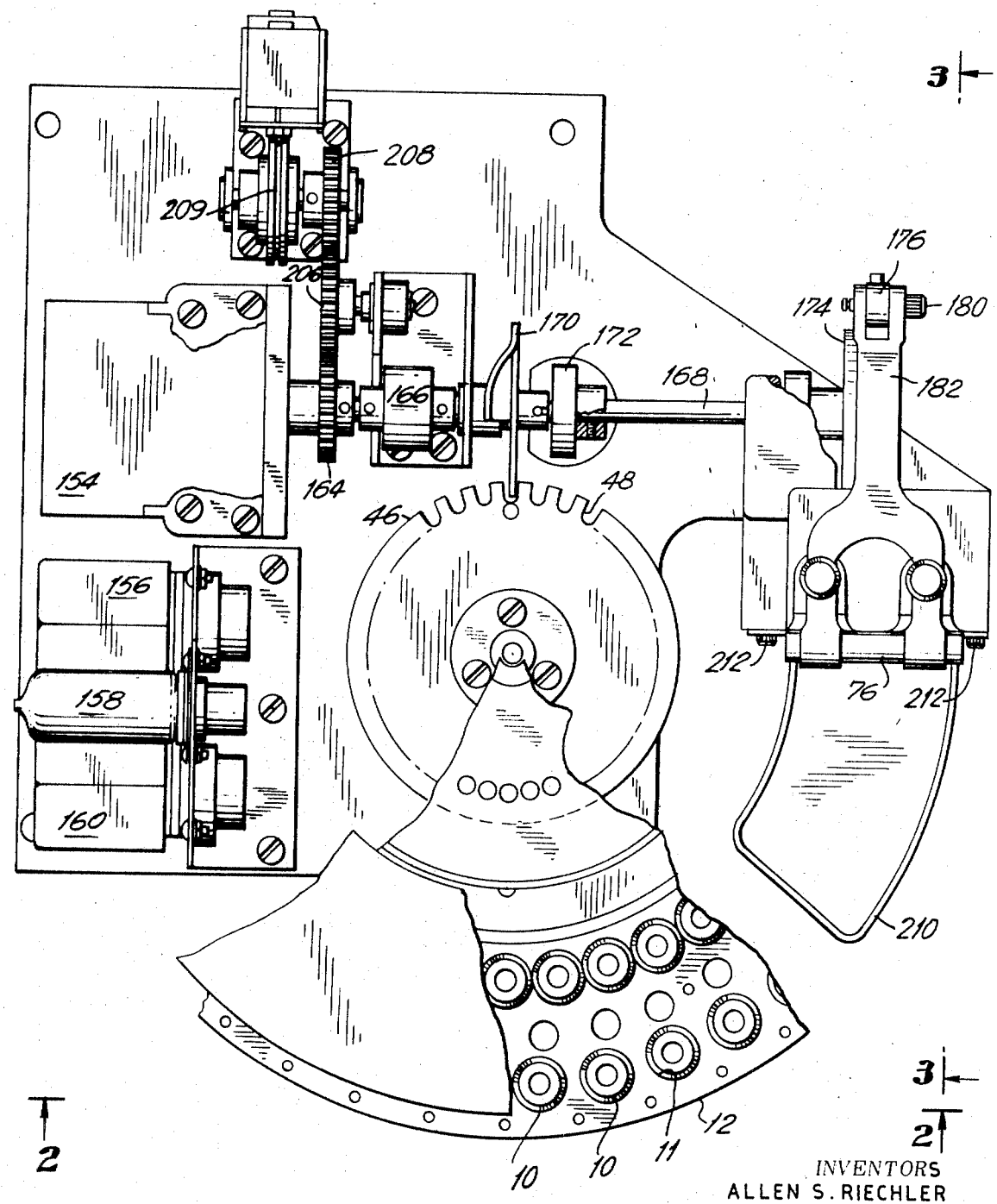
FIG. 1 is a top view in plan of a sampler embodying this invention.

A plurality of sample containers 10, shown as eighty containers in two concentric annular rows, are disposed in respective apertures 11 in a sample plate 12. Each sample container 10 has a substantially tubular sidewall 14 and a cone shaped bottom wall 16 with a central bore 18. An inert, porous disk 20 is disposed in the tube on a shoulder formed by the side and bottom walls. A volume 22 of ion-exchange resin or other sample flow retarding material is disposed on the disk 20 and is capped by another insert, porous disk 24 pressed into the tube. Depending on the size of the volume 22, an additional insert rod 26 of slightly smaller diameter so as to provide an annular gap 27 may be disposed on the disk 24 to fill the volume of the container 10. The upper outer portion of the container 10 has a shoulder 28 to limit the insertion of the container into the aperture 11. The upper inner portion of the container has a cone shaped counterbore 30. The sample plate is indexed periodically to present two sample containers concurrently to and between a pair of chromatography column inlet fittings 32 and 34 and a pair of eluting liquid supply fittings 36 and 38.

The sample plate is releasably supported on and indexed by a drive assembly 40 which includes a drive plate 42 fixed to a hub 44 which is fixed to a Geneva wheel 46 having forty notches 48. The drive plate 42 has a plurality of upstanding pins 50 which are received by a corresponding plurality of bores in the sample plate 12. The hub 44 is fixed to a central shaft 52 by a set screw 54. The shaft 52 extends downwardly through and beyond an upper bearing 56 and a lower bearing 58 which are mounted in a hub 60 fixed to a main plate 62, and has a lower end 64 which rests on one end 66 of a rocker arm 68 which is pivoted to the underside of the main plate. A C-clip 70 on the shaft captures the shaft to the bearing assembly.

The chromatography column inlet fittings 32 and 34 and the eluting liquid supply fittings 36 and 38 are supported in respective axial alignment in a main casting 72 which is fixed to the main plate 62. The main casting has a head portion 74 with a crownwall 76, a foot portion 78, and a connecting web 80. The head portion has two bores 82, 84 with respective bushings 86, 88 to respectively accommodate the supply fittings 36 and 38, and the foot portion has two slots 90, 92 to respectively accommodate the column inlet fittings 32, 34.

Each supply fittings includes a push rod 94 disposed within the bushing 88 (or 86), and having two C-clips 96, 98 snapped into respective grooves therein. The rod is biased upwardly by a helical compression spring 99 disposed about the upper portion of the bushing 86 and captured between an annular web 100 of the bushing and a cross portion of a spring cup 102, whose upper end bears against the lower C-clip 98. The rod may be pushed downwardly by a cap 104 which is fitted over the upper end of the rod and whose inner tubular portion bears against the upper C-clip 96. The outer, lower tubular portion of the cap fits within and against a spring retainer 106. The spring retainer 106 and the spring cup are biased apart by a helical compression spring 107 captured therebetween.

The lower end of the push rod 94 is press fitted into an upper blind bore 108 in a neck of a plug 110 and secured by a cross-pin, not shown. A support ring 112 is disposed about the neck on the plug and clamps the wall of the neck of the plug about the end of the push rod by means of a set screw 113. The plug 110 has a boss 114 projecting from its central lower face which complements and mates with the cone-shaped counter-bore 30 in the top of the sample receptacle 10; and has an annular shoulder 116 which sits on top of the rim of the sample receptacle. A plurality of counter-bored bores 118 are formed through the plug, opening onto the annular shoulder 116. A plurality of plungers 120, having lower portions of reduced diameter, are respectively disposed in these bores, and biased downwardly by respective compression springs 122. The lower ends of these plungers rest on the rim of the sample container 10 and push to separate the plug from the sample container. The boss 114 has an annular groove therein, which receives an O-ring 124. A central, blind bore 126 runs upwardly through the boss and connects with a radial blind bore which receives a union 128 on the periphery of the plug. The union 128 may be coupled to a source of eluting fluid under pressure. Such fluid will pass through the radial bore and the central bore 126 into the sample container 10. When the boss is removed from the container 10, the plungers serve to overcome the locking-together action of the mating cones, and ensure that the sample container remains in the sample plate. A guide rod 131 has its lower end press fitted into a bore in the ring 112 and its upper end slidably disposed in a bore in the head portion 74, to preclude rotation of the respective assembly 36 or 38.

The chromatography column inlet fittings 32 and 34 each comprise a block 130 having an upwardly directed boss 132 and a central counter-bored bore 134 therethrough. The upper end of the boss has a bore enlargement with roller over lips which capture an O-ring 136. The lower end 16 of the sample container 10 is adapted to enter into this bore enlargement, with its outlet bore 18 in alignment with the bore 134 and sealed by the O-ring 136. An annular trough 138 is formed into the block around the boss 132, and has a drain nipple 140 coupled thereto. A tube 142, which is externally threaded along the upper length thereof, is threaded into the lower end of the bore 134. An inner tube 144 is sealed into the central bore of the tube 142 and extends into the bore 134. The junction of the tube 142, 144 and the block 130 is sealed with an O-ring 146. A washer 148, and two internally threaded knobs 150 and 151 ride on the exterior of the tube 142. Knob 150 serves to clamp the fitting into the slot of the foot 78 of the main casting. Knob 151 serves to fix the height of the chromatography column with respect to the tube 142. An O-ring 152 is provided in the exterior of the lower portion of the tube to provide a seal with the inlet fitting of a chromatography column when the lower portion of the tube is inserted therein. The lower end of the tube is obturated by an annular disk porous filter 153a held in place by a multi-apertured screw 153b. The screw has an axial blind bore 153c coupling the inner tube 144 with two diametrical bores 153d and 153e which are covered by the filter 153a. The head of the screw and the filter are disposed into the upper portion of the resin of the column. The effluent flows through the tube 144, the bore 153c, the bores 153d and 153e, and through the pores of the filter into the resin R of the column at a relatively low velocity and without further dilution by buffer, as shown in FIG. 8.

The sample table 12 is periodically raised, indexed and lowered by an electric motor 154 operated under the control of three relays 156, 158, 160 and a snap action switch 162. The output shaft of the motor has a gear 164 and a coupling 166 fixed thereto. The coupling is fixed to a drive shaft 168 on which are fixed a Geneva cam 170, a cam 172 and a wheel 174. A crank arm 176 has one end pinned at 178 to the wheel 174, and the other end pinned at 180 to the end-clevis of a fork-arm 182. The other ends of the fork arm are disposed in notches in the upper end of the crown wall 76 and are pinned at 184. Each arm also carries a threaded rod 186 having an adjusting knob 188 at one end and a pressure sphere 190 at the other end. A locking nut 192 maintains the adjustment of the height of the sphere, which bears against the cap 104 on the push rod 94. The cam 172 bears against the upper end of a pin 200, which slides in a pin guide 202, and whose lower end bears against an end 204 of the rocker arm 68.

The drive gear 164 is meshed with an idler gear 206 which meshes with a gear 208 which is fixed to a cam 209. The cam 209 actuates the snap action switch 162.

In operation, the relays, which are cyclically actuated by an external programming device, such as is shown in the U.S. Patent application by J. Eveleigh et al., Ser. No. 682,430, filed Nov. 13, 1967, and assigned to a common assignee, energize the motor 154, which rotates the drive shaft 168. The wheel 174 rotates to raise the crank arm 176, to raise the pressure spheres 190, to permit the springs 99 to raise the push rods 94, to raise the spheres 190 from the respective discharged sample containers. The cam 172 depresses the pin 200, which shifts the rocker arm 68, to raise the shaft 52, to raise the sample plate 12 and its sample containers 10. The Geneva cam 170 rotates the Geneva wheel 46 and the sample table to present the next successive pair of fresh sample containers to the fittings. The cam 172 releases the pin 200 which permits the sample table to lower, setting the fresh sample containers on their respective column inlet fittings 32, 34, with the lower ends of the containers riding into sealed relationship with the tops of the blocks 130. The wheel 174 lowers the crank arm 176, lowering the pressure spheres 190, depressing the push rods 94, depressing the eluting liquid supply fittings 36 and 38 with their respective plugs 110 into sealed engagement with the tops of the sample containers. The cam actuates the snap action switch to deenergize the motor. The eluting liquid may now be passed into the unions 128 to flush the samples from the sample containers into the chromatography columns.

A drip pan 210 is secured by screws 212 to the foot of the main casting to catch any drippings from the discharged sample containers.

A cover 214 is disposed on top of the sample plate 12, and is prevented from rotating by a bracket 216. The cover is apertured adjacent the main casting 76 to provide access for the fittings 36 and 38 to the sample containers therebelow.

The chromatography inlet fittings 36 and 38 may have their respective tubes 142 inserted in suitable chromatography column assemblies 300 and 302. The columns each comprise a suitable water jacket 304 having inlet and outlet fittings 316, 318. The per se chromatography column 320 is disposed within the water jacket by suitable plugs and fittings. Mechanically both the column assemblies are made the same length; however the length of the column of resin in the basic column is customarily much shorter than the length of the column of resin in the acid-neutral column. The difference is made up by suitable insert rods 322.

While the preferred embodiment of the invention has been shown and described, it will be understood that the invention may be embodied otherwise than as herein specifically illustrated or described, and that certain changes in the form and arrangement of parts and in the specific manner of practicing the invention may be made without departing from the underlying idea or principles of this invention.

What is claimed is:

1. Automatic sample loading apparatus for a chromatography column having an inlet means, comprising:
    sample support means having
        means providing a plurality of apertures in spaced apart, parallel relationship;
    eluting fluid inlet means;
    eluting fluid outlet means disposed below and spaced from said eluting fluid inlet means along an axis;
    first motive means for intermittently moving said sample support means to successively dispose each of said apertures along said axis and in conjunction with said intermittent movement for reciprocating said sample support means along said axis; and
    second motive means for providing relative reciprocating movement between said inlet means and said outlet means along said axis.

2. Apparatus according to claim 1 further including:
    a plurality of tubular sample containers, each disposed in a respective one of said apertures in said support means;
    each of said containers having a plug-like lower end having an external conical shape, and having a socket-like upper end having an internal conical shape;
    said eluting fluid inlet means including a tube having a plug-like lower end having an external conical shape adapted to be received in and to mate with the said upper end of each of said containers;
    said eluting fluid outlet means including a tube having a plug-like upper end having an internal conical shape adapted to receive and to mate with said lower end of each of said containers.

3. Apparatus according to claim 2 wherein said
    first motive means, for each successive sample container, initially advances such container to said axis, subsequently lowers such container to engage with said eluting fluid outlet means, and ultimately raises such container to disengage from said eluting fluid outlet means; and
    said second motive means, for each successive sample container, initially lowers said eluting fluid inlet means to engage such sample container after such sample container has engaged said eluting fluid outlet means, and subsequently raises said eluting fluid inlet means to disengage such sample container before such sample container has disengaged from said eluting fluid outlet means.

4. Apparatus according to claim 3 wherein
    said eluting fluid inlet means includes a plunger terminating in said tube having said plug-like lower end; and
    said second motive means includes
    a first spring means normally biasing said plunger upwardly, away from such sample container, and
    actuator means, coupled to said plunger by a second spring means, for displacing said plunger downwardly, to such sample container.

5. Apparatus according to claim 4 wherein
    said actuator means includes a crank operated linkage which compresses said second spring means against said plunger.

6. Apparatus according to claim 5 wherein said sample container support means comprises a rotatable table having said apertures disposed in an annular row;
    said table being mounted on a central shaft having a second axis and free for reciprocation along said second axis; and
    said first motive means includes means for rotating said table about said second axis and means for reciprocating said table along said second axis.

7. Apparatus according to claim 6 for two chromatography columns wherein
    said plurality of sample containers are arranged in two annular rows on said table; and
    two eluting fluid inlet means and two eluting fluid outlet means are respectively disposed along two parallel axes to respectively concurrently engage two sample containers, one in each row;
    both of said eluting fluid inlet means being operated by the same crank operated linkage.

8. Apparatus according to claim 4 wherein
    said plunger further includes spring means for engaging such sample container and for normally biasing said plunger away from such container.

9. Apparatus according to claim 2 wherein each sample container comprises:
    a tubular body having
    a central bore having a mediate portion of a first diameter, a lower portion tapering in to a second, smaller, diameter and an upper portion tapering out to a third, large diameter, and
    an external surface having a mediate portion, and a lower portion tapering in to a second, smaller diameter; and
    a porous disk disposed in said central bore in said lower portion thereof, and
    a volume of sample flow retarding material disposed in said central bore and supported by said disk.

References Cited
UNITED STATES PATENTS
3,038,340    6/1962    Isreeli.
3,240,068    3/1966    Horeth et al. _____ 73—421.5

FOREIGN PATENTS
1,507,455    12/1967    France.

LOUIS R. PRINCE, Primary Examiner

H. C. POST III, Assistant Examiner